(12) United States Patent
Asano et al.

(10) Patent No.: US 6,820,187 B2
(45) Date of Patent: Nov. 16, 2004

(54) MULTIPROCESSOR SYSTEM AND CONTROL METHOD THEREOF

(75) Inventors: Shigehiro Asano, Yokosuka (JP); Mitsuo Saito, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 570 days.

(21) Appl. No.: 09/989,028

(22) Filed: Nov. 21, 2001

(65) Prior Publication Data

US 2002/0062352 A1 May 23, 2002

(30) Foreign Application Priority Data

Nov. 22, 2000 (JP) ........................................ 2000-356237

(51) Int. Cl.⁷ ........................ G06F 15/163; G06F 15/80
(52) U.S. Cl. ........................................ 712/21; 710/22
(58) Field of Search .............................. 710/22; 712/21

(56) References Cited

U.S. PATENT DOCUMENTS 5,701,482 A * 12/1997 Harrison et al. ............ 718/105
6,280,082 B1 * 8/2001 Aoyama et al. ............ 374/121
6,442,627 B1 * 8/2002 Negishi et al. ............... 710/52

* cited by examiner

*Primary Examiner*—William M. Treat
(74) *Attorney, Agent, or Firm*—Oblon, Spivak, McClelland, Maier & Neustadt, P.C.

(57) ABSTRACT

A multiprocessor system including a master processor, a plurality of processor elements, each of which is provided with a local memory, the processor elements being controlled in accordance with commands from the foregoing master processor, and a global memory shared by the plurality of processor elements is disclosed. The processor elements are provided with a command pooling buffer capable of accumulating a plurality of commands, respectively. DMA controllers are also provided with a command pooling buffer capable of accumulating a plurality of commands, respectively. The master processor persistently issues a plurality of commands to the DMA controller and each processor element. A counter array manages the number of the issued commands which have received no response. When the responses are returned with respect to all issued commands, the counter array notifies the master processor of this.

18 Claims, 11 Drawing Sheets

| PLS managing table | | DLS managing table | | | DLS' managing table | | |
|---|---|---|---|---|---|---|---|
| 0 | 44 | 0 | 44 | D | 0 | 44 | D |
| 1 | 44 | 1 | 44 | D | 1 | 44 | D |
| 2 | 44 | 2 | 44 | R | 2 | 44 | D R |
| 3 | — | 3 | 44 | R | 3 | 44 | D R |
| 12 | — | 12 | — | | 12 | — | |
| 13 | — | 13 | — | | 13 | — | |
| 14 | — | 14 | — | | 14 | — | |
| 15 | — | 15 | — | | 15 | — | |

F I G. 8     F I G. 9A     F I G. 9B

PLS command table

| VTID | GM address of origin of transfer | Forwarding page (bit vector) | | | | | | | |
|---|---|---|---|---|---|---|---|---|---|
| | | 0 | 1 | 2 | 3 | ……… | 13 | 14 | 15 |
| 44 | 0x120000 | 1 | 1 | 1 | 0 | ……… | 0 | 0 | 0 |
| 50 | 0x140000 | 0 | 0 | 0 | 0 | ……… | 0 | 1 | 1 |

| VTID | GM address | Direction | Transfer page (for each page) | | | | | | | |
|---|---|---|---|---|---|---|---|---|---|---|
| | | | 0 | 1 | 2 | 3 | | 13 | 14 | 15 |
| 44 | 0x20000 | D | D | D | R | R | ......... | 0 | 0 | 0 |
| 44 | 0x40000 | G | 0 | 0 | D | D | ......... | 0 | 0 | 0 |

Constitution of DLS command table

| VTID | Start page | Used page (bit vector) 0 | 1 | 2 | 3 | ... | 13 | 14 | 15 |
|---|---|---|---|---|---|---|---|---|---|
| 44 | 0 | 1 | 1 | 0 | 0 | ......... | 0 | 0 | 0 |
| 50 | 0 | 0 | 0 | 1 | 1 | ......... | 0 | 0 | 0 |

PE command table

MULTIPROCESSOR SYSTEM AND CONTROL METHOD THEREOF

CROSS-REFERENCE TO RELATED APPLICATIONS

This application is based upon and claims the benefit of priority from the prior Japanese Patent Application No. 2000-356237, filed Nov. 22, 2000, the entire contents of which are incorporated herein by reference.

BACKGROUND OF THE INVENTION

1. Field of the Invention

The present invention relates to a multiprocessor system and a control method thereof. More specifically, the present invention relates to a multiprocessor system which transfers data/program between a global memory and a local memory of each processor element by the DMA transfer.

2. Description of the Related Art

Conventionally, a multiprocessor system has been well known as a method for speeding up computers. The multiprocessor system includes a tightly-coupled multiprocessor system employing a shared memory system that shares a memory and a loosely-coupled multiprocessor system having the memories distributed on the processors.

As the shared memory system can communicate between the processors through the shared memory, this involves a problem, although the programming is simple, such that a special mechanism in association with a shared memory access which enables respective processors to refer to the shared memory under a state that the matching of the data has been kept is needed and the hardware becomes complicated.

In the loosely-coupled multiprocessor system, the communication between the processors by the use of the shared memory is not carried out, so that this involve a problem such that it is necessary to provide a function for the communication between the processors by a program which controls the function for each processor and it is difficult to manufacture a program, although it is possible to simplify the hardware on this account.

In order to easily control the loosely-coupled multiprocessor system, a method is known such that a master processor to control respective processors is provided and this master processor transmits a command to other respective processor elements. Controlling an order of commands to be transmitted to other respective processor elements and timing thereof on the master processor enables the operation of the entire multiprocessor system to be easily controlled.

Each processor element has a local memory in the loosely-coupled multiprocessor system. Even in the loosely-coupled multiprocessor system, when there is a memory (a global memory) capable of being commonly used in each processor element, the programming is easier and it is also possible to miniaturize a memory size of each local memory.

However, it takes a long time to have access to the global memory because of the bus arbitration and other factors, compared with that of the local memory. If a processor resource has been appropriated for a long time in order to have access to the memory, throughput has been decreased.

In order to improve this, recently, a mechanism is projected such that the data/program are transferred between the global memory and the local memory of each processor element by the DMA transfer.

In this case, according to a program executed in the master processor, a procedure to control each processor element and a DMA controller is described. By describing this program in a multithread, it is possible to use a plurality of processor elements effectively.

However, a processing time of individual processor elements and a time for the DMA transfer are unforeknown, so that even in the case of controlling each processor element and the DMA controller in a multithread program to be executed on the master processor, it is difficult to effectively assign the processing operation corresponding to each thread to the corresponding processor element in fact. In order to decrease a time during the processor element has been vacant, the following two problems have to be solved.

A first problem is as follows. Since there is dependency in the processing of the DMA and the processor element, the master processor is used in order to control this dependency. However, the operation of the master processor is not effective, if the interruption in the master processor and the switching of the thread are carried out each time when the DMA and the processing of the processor element are terminated. Particularly, if the number of the processor elements to be controlled by the master processor is increased, the processes such as the interruption in the master processor and the switching of the thread are frequently performed, so that the processing efficiency has been decreased.

A second program is that, in the case of allowing a certain processor element to perform the operation in association with not less than two threads executed on the master processor, data which is DMA-transferred to the local memory by the control of a certain thread is used in the processing in association with another thread.

For example, it is considered that a thread A and a thread B are executed in parallel on the master processor and the processor element processes the data on the local memory by the control of these threads. In this case, depending on a relation between timing for switching the thread A and the thread B and a time for processing the DMA and the processor element, before the data for the thread A, which has been DMA-transferred from the global memory to the local memory, is processed in fact by the processing operation of the processor element in association with the thread A, the switching from the thread A to the thread B is executed, so that the data for the thread A is possibly used by the processing operation of the processor element in association with the thread B. Hereby, a defect has been occurred in the data to be treated.

BRIEF SUMMARY OF THE INVENTION

The present invention has been made taking the present problems into consideration, an object of the invention to provide a multiprocessor system capable of decreasing a time during a processor element has been vacant so as to improve the throughput without a problem with respect to increasing a load of a master processor and unconformity of data to be treated and a control method thereof.

According to one aspect of the present invention, there is provided a multiprocessor system comprising: a master processor that issues commands; a plurality of processor-elements, each of which has a local memory and a first command pooling buffer, the first command pooling buffer pooling the commands issued from the master processor, wherein the processor-elements are controlled by the commands in the buffer; a global memory which is common to the master processor and the processor-elements; a transfer device having a second command pooling buffer, the transfer device being controlled by some of the commands issued from the master processor, to transfer a program/data between the local memory of the processor-elements and the global memory, wherein the commands are pooled in the second command pooling buffer; and a counter device to notify the master processor that the number of responses to the commands issued from the master processor, returned from the processor-elements and transfer device, has reached a predetermined number of responses, the predetermined number being pre-stored in the counter device.

DESCRIPTION OF THE PREFERRED EMBODIMENTS

Embodiments according to the present invention will be explained with reference to the drawings below.

First Embodiment

Figure 1:
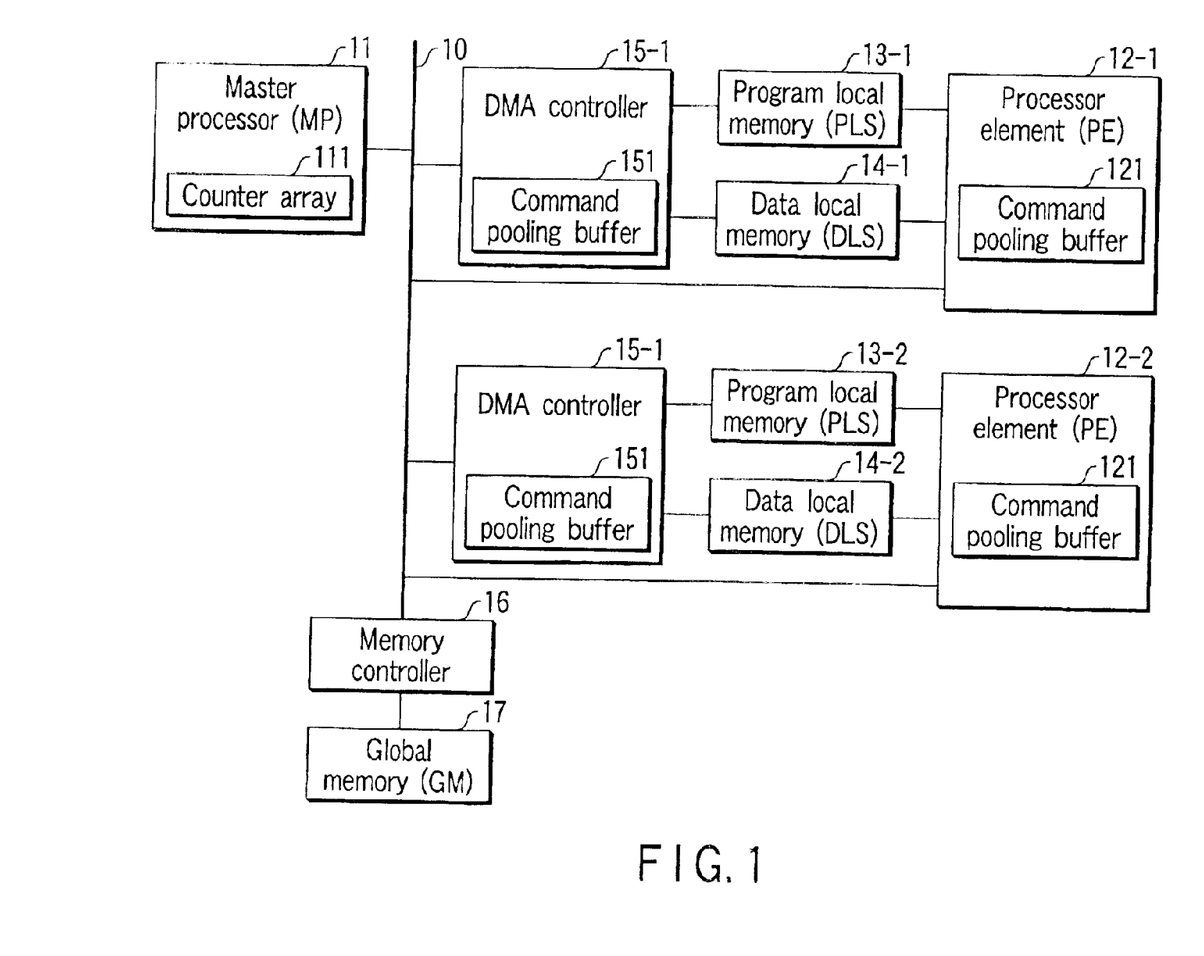
FIG. 1 is a block diagram for illustrating a configuration of a multiprocessor system according to a first embodiment of the present invention.

FIG. 1 illustrates a configuration of a multiprocessor system according to a first embodiment of the present invention. This multiprocessor system is a multiprocessor system in a loosely-coupled multiprocessor system, and comprises a bus 10, a master processor (MP) 11 and two processor elements (PE) 12-1 and 12-2 as shown in FIG. 1. The master processor (MP) 11 serves to control the two processor elements (PE) 12-1 and 12-2 and all of the processing operations due to the processor elements (PE) 12-1 and 12-2 are carried out in accordance with commands to be issued from the master processor (MP) 11.

Each of the two processor elements (PE) 12-1 and 12-2 is a slave processor and has a local memory to store a program and data to be processed, respectively. A program local memory (PLS: Program Local Storage) 13-1 and a data local memory (DLS: Data Local Storage) 14-1 are local memories of the processor element (PE) 12-1. Further, a program to be carried out by the processor element (PE) 12-1 is stored in the program local memory (PLS) 13-1 and the data or the like to be processed by the processor element (PE) 12-1 is stored in the data local memory (DLS) 14-1. In the same way, a program local memory (PLS: Program Local Storage) 13-2 and a data local memory (DLS: Data Local Storage) 14-2 are local memories of the processor element (PE) 12-2. Further, a program to be carried out by the processor element (PE) 12-2 is stored in the program local memory (PLS) 13-2 and the data or the like to be processed by the processor element (PE) 12-2 is stored in the data local memory (DLS) 14-2.

Further, DMA controllers 15-1 and 15-2 are connected to the bus 10 as well as a global memory (GM) 17 is connected thereto through a memory controller 16. The global memory (GM) 17 is kind of a shared memory, which the processor elements (PE) 12-1 and 12-2 are capable of using in common. A program to be executed by the master processor (MP) 11 and the processing data are stored in this global memory (GM) 17 as well as a program to be executed by the processor elements (PE) 12-1 and 12-2 and the processing data are stored therein. By transferring a necessary program from this global memory (GM) 17 to the program local memories (PLS) 13-1 and 13-2, respectively, the processor elements (PE) 12-1 and 12-2 can execute relatively large program without increasing the memory sizes of the program local memories (PLS) 13-1 and 13-2.

Alternatively, by transferring the data between the global memory (GM) 17 and each of the data local memories (DLS) 14-1 and 14-2, it is possible to easily control so as to transfer the data to be processed from the global memory (GM) 17 to the data local memories (DLS) 14-1 and 14-2 so that the transferred data is processed by the processor elements (PE) 12-1 and 12-2, respectively and to transfer the data of respective processing results from the data local memories (DLS) 14-1 and 14-2 to the global memory (GM) 17 or the like.

The DMA controllers 15-1 and 15-2 perform the DMA transfer of the data/program between the corresponding local memory and the global memory (GM) 17 in accordance with commands from the master processor (MP) 11, respectively. Due to the existence of these DMA controllers 15-1 and 15-2, it is possible to transfer the data/program between the local memory and the global memory (GM) 17 effectively without appropriating a resource of the processor elements (PE) 12-1 and 12-2 and the master processor (MP) 11.

As described above, the processing of the processor elements (PE) 12-1 and 12-2 and the operations of the DMA controllers 15-1 and 15-2 are wholly controlled by the master processor (MP) 11. This control processing is carried out by a multi thread program to be executed on the master processor (MP) 11. A plurality of threads configuring the multi thread program are executed in parallel on the master processor (MP) 11. A necessary calculation processing or the like for each thread is executed by use of the processor element 12-1 or 12-2. In other words, by controlling an order of the commands to be transmitted to the DMA controller 15-1 or 15-2 and the processor element 12-1 or 12-2 and timing thereof, it is possible to allow the processor element to carry out the necessary calculation processing and to transfer this processing result on the global memory (GM) 17. Basically, the processing will be performed in the following procedure.

1) DMA-transfer a program from the global memory (GM) to the program local memory (PLS)
2) DMA-transfer the data to be processed from the global memory (GM) to the data local memory (DLS)
3) processing by the processor element
4) transfer the processing result data from the data local memory (DLS) to the global memory (DLS)

For example, the present multiprocessor system is used as a computer incorporated in an industrial machine and a machine for household use. In this case, all modules except for the global memory (GM) 17 among a plurality of functional modules shown in FIG. 1 can be integrally formed on one chip LSI.

According to the present multiprocessor system, in order to treat some commands necessary for a series of control by the gross, a command pooling buffer 121 capable of accumulating a plurality of commands are provided on the processor elements (PE) 12-1 and 12-2, respectively. A command pooling buffer 131 capable of accumulating a plurality of commands are also provided on the DMA controllers 15-1 and 15-2, respectively. Each of these command pooling buffers 121 and 131 is a kind of command queue (a pool) capable of passing-controlling.

Due to the existence of these command pooling buffers 121 and 131, it is possible to issue a plurality of commands from the master processor (MP) 11 to the DMA controllers 15-1 and 15-2 and from the master processor (MP) to each processor element (PE) by the gross and further, whereby a next command can be issued without waiting for a response to the command transmitted precedently. Further, the number of the issued commands which have received no response is managed by a counter array 111 provided in the master processor (MP) 11. When the responses are returned to all issued commands, the master processor (MP) 11 is notified that all issued commands have received the responses. By allowing the master processor (MP) 11 to perform the operation such as switching of a thread or the like for the first time upon receiving this notification, it is possible to decrease a load of the master processor (MP) 11 while considering the dependency between the DMA and the processing of respective processor elements 12-1 and 12-2. In this case, in order to switch the threads more smoothly, it is preferable to manage the number of the issued commands which have received no response for each thread in fact.

Consequently, according to the present embodiment, specific identifier VTIDs (Virtual Thread ID) are provided to each thread. The counter array 111 are provided with specific counters for each VTIDs. Each of the corresponding counter is increased by the issue of the command from the master processor (MP) 11. The VTIDs are transmitted to the DMA controllers 15-1 and 15-2 and the processor elements (PE) 12-1 and 12-2 together with the commands. Corresponding VTIDs are returned to the master processor (MP) 11 together with the responses from the DMA controllers 15-1 and 15-2 and the processor elements (PE) 12-1 and 12-2. Then, the master processor (MP) 11 decreases the counters corresponding to the VTIDs returned in correspondence to the responses. If the counter becomes 0, by notifying the corresponding thread of it and changing a sleep state to an executing state in this thread, it is possible to switch the thread to the executing thread more smoothly. This is shown in FIGS. 2A and 2B.

Figure 2A:
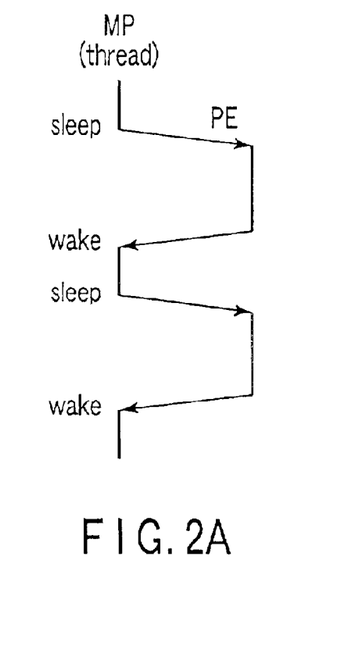
FIG. 2A is a drawing for explaining an example such that a state transition of a thread is controlled in correspondence to the number of commands which have received no responses according to the first embodiment.

FIG. 2A is equivalent to a conventional case. The thread executed on the master processor (MP) 11 receives the response twice by issuing the command to the processor element (PE) twice. According to this example, when the command is issued, the thread is put sleep and when the response is received, the command arises again. In this case, the command may arise by the interruption and the sleeping may be replaced by busy-waiting.

Figure 2B:
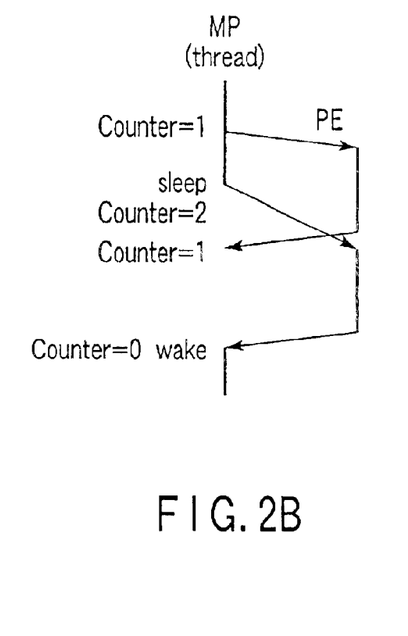
FIG. 2B is a drawing for explaining an example such that a state transition of a thread is controlled in correspondence to the number of commands which have received no response according to the first embodiment.

FIG. 2B illustrates the present embodiment. In FIG. 2B, at a point of time when the command is given from the thread executed on the master processor (MP) 11 to the processor element (PE) for the first time, a value of a counter becomes 1. After that, a second command is given to the processor element (PE) so that this thread is put sleep. At this time, the value of the counter is 2. Then, a response in correspondence to the first command is returned by the processor element (PE) and the value of the counter becomes 1. At last, a response in correspondence to the second command from the processor element (PE) and the value of the counter becomes 0, so that the sleep thread is initiated.

During a certain thread is sleeping, another thread is executed on the master processor (MP) 11, so that the master processor (MP) 11 can perform another processing while waiting for processing of some commands necessary for a series of processing. It is decided how much number of the commands should be generated to put sleep the thread depending on a description of each thread.

As described above, by providing a simple hardware such as a counter, an overhead is decreased to put the thread on the master processor (MP) 11 sleep or initiate it again. As a matter of course, when the interruption, the busy-waiting or the like is used, the overhead is similarly decreased.

Figure 3:
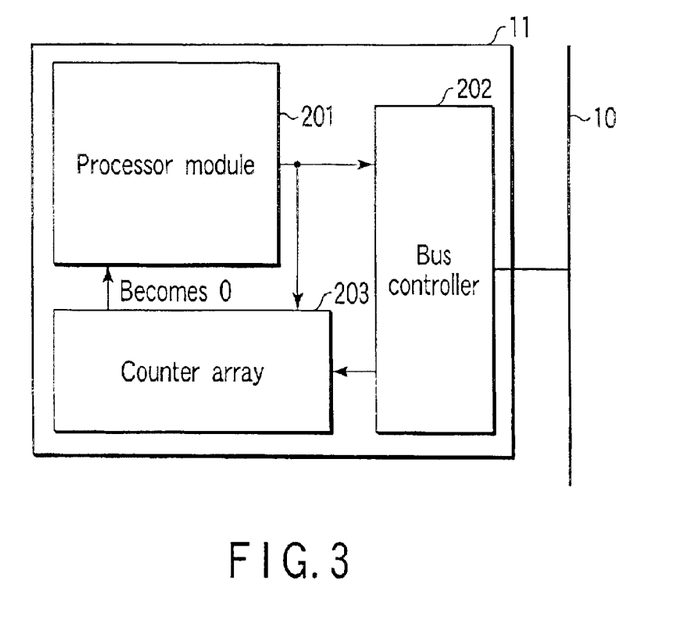
FIG. 3 is a block diagram for illustrating a configuration of a master processor according to the first embodiment.

A hardware in order to realize such a mechanism, a configuration shown in FIG. 3 can be considered.

FIG. 3 illustrates the master processor (MP) 11 and the bus 10 connected thereto. As shown in FIG. 3, the master processor (MP) 11 includes a processor module 201, a bus controller 202 and a counter array 203. This counter array 203 is the same as the counter array 111 shown in FIG. 1.

Upon issuing a command from the processor module 201, the command is transmitted to the bus controller 202 together with the VTID of the thread from which the command has been issued. The VTID is given from the processor module 201 to the counter array 203. The counter array 203 increases the counter corresponding to the VTID. When the response is returned together with the VTID through the bus 10, the corresponding counter of the counter array 203 is decreased. When the counter becomes 0, the processor module 201 is notified of this, the thread of the corresponding VTID is initiated and the thread in which the responses are returned to all issued commands is notified of the completion of the command processing.

Next, with reference to the flow charts shown in FIG. 4 and FIG. 5, the operations of respective threads executed on the master processor (MP) 11 and the operations of the DMA controller and the processor element controlled by the commands from respective threads will be described below.

Figure 4:
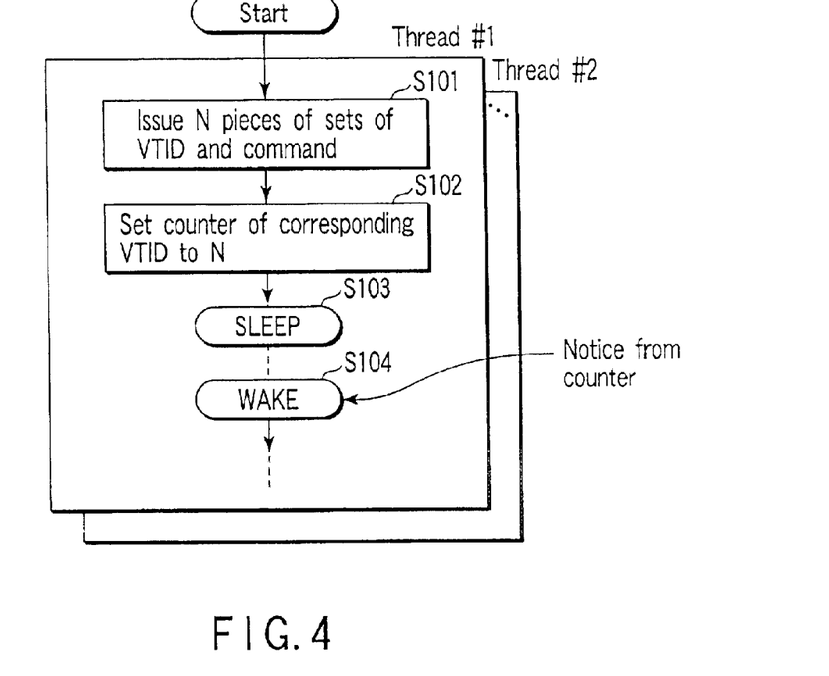
FIG. 4 is a flow chart for illustrating the operation of a thread executed on the master processor, according to the first embodiment.

FIG. 4 illustrates the operation of each thread executed on the master processor (MP) 11. At first, the thread issues N pieces of sets of the VTID and the command sequentially with respect to the DMA controllers 15-1 and 15-2 and the processor elements (PE) 12-1 and 12-2 (step S101). Then, after the thread sets a counter of the corresponding VTID to N (step S102), the thread shifts to a sleep state (step S103). Then, if the notification is transmitted from the counter array 203, the thread of the VTID corresponding to the counter of which counter value becomes 0 is initiated from the sleeping state (step S104), the processing by this initiated thread will be continued.

Figure 5:
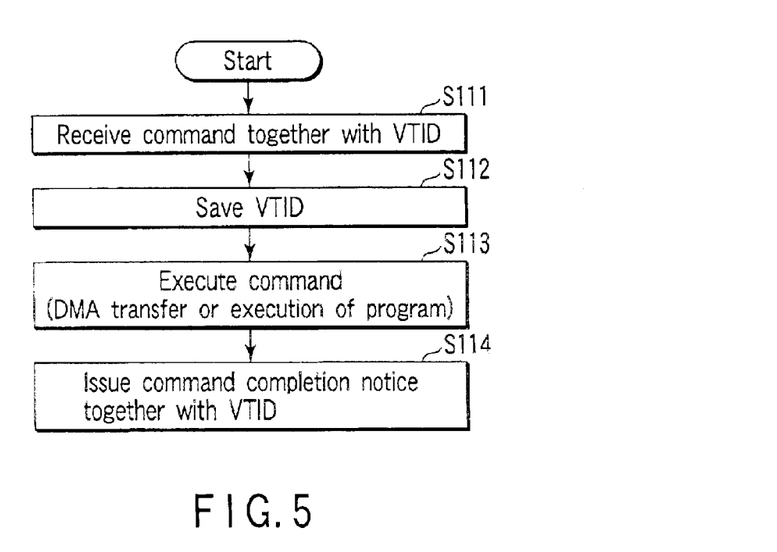
FIG. 5 is a flow chart for illustrating the operations of a DMA controller and a processor element according to the first embodiment.

FIG. 5 illustrates the operations of the DMA controllers 15-1 and 15-2 and the processor elements (PE) 12-1 and 12-2.

If the DMA controller or the processor element receives a command from the master processor (MAP) 11 (step S111), at first, the VTID corresponding to this command is saved (step S112) and then, the command processing is performed (step S113). According to this command processing, the DMA controllers 15-1 and 15-2 perform the DMA transfer specified by the command, and the processor elements perform the program execution processing specified by the command.

If the command processing is terminated, the DMA controller or the processor element, which has executed this command, issues a command completion notice as a response in correspondence to this command as well as the saved VTID to the master processor (MP) 11 (step S114).

According to the present multiprocessor system, the number of the issued commands which have received no response is managed by the counters provided in the identifier VTID and the master processor (MP) 11 for each thread. When the processing of all of the issued commands are terminated, it is possible to effectively use the master processor (MP) 11 by notifying the master processor (MP) 11 of this and initiating the interaction serving to trigger the switching between the threads or the like.

The present embodiment makes it possible to decrease the number of the interruption processing or the like and to decrease a load of the master processor (MP) 11, even when a program on the master processor (MP) 11 is operating on a single thread.

Second Embodiment

Next, as a second embodiment of the present invention, a specific procedure for the control of a DMA and each PE and a mechanism for managing a local memory will be described below.

Figure 6:
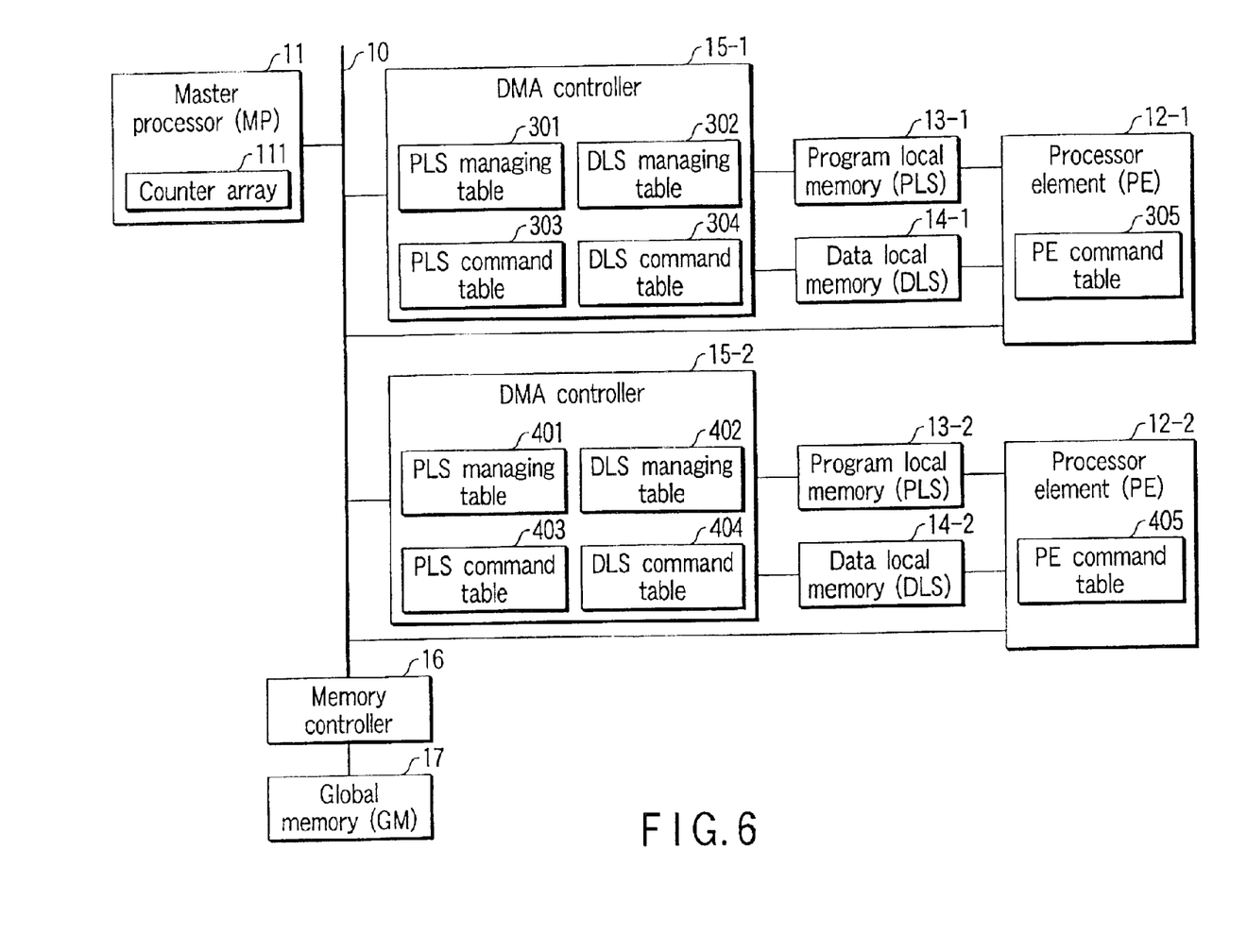
FIG. 6 is a block diagram for illustrating a configuration of a multiprocessor system according to a second embodiment of the present invention.

FIG. 6 illustrates a configuration of a multiprocessor system according to the second embodiment of the present invention. In the present multiprocessor system, a table for managing the local memory is provided so that it manages to which VTID a program and data located in the local memory correspond. Hereby, in addition to an effect of the above described first embodiment, it is possible to solve a problem due to the unconformity of the data to be treated. The DMA controller and the processor element can specify a command capable of being executed among a pool of a command by referring a managing table of the corresponding local memory. Therefore, it becomes possible to accurately execute the commands from the executable command by rotation. The second embodiment will be explained specifically below.

As shown in FIG. 6, the DMA controller 15-1 is provided with a PLS managing table 301 and a DLS managing table 302 as a managing table which manages the local memory of the processor element (PE) 12-1.

The PLS managing table 301 manages in which thread a corresponding program is stored for each storage area of the program local memory (PLS) 13-1. Additionally, the DLS managing table 302 manages in which thread a corresponding program is stored for each storage area of the data local memory (DLS) 14-1.

A PLS command table 303 and a DLS command table 304 provided to the DMA controller 15-1 are equivalent to a command pooling buffer 151 shown in FIG. 1. The command with respect to the DMA transfer between the program local memory (PLS) 13-1 and the global memory (GM) 17 is accumulated in the PLS command table 303 and the command with respect to the DMA transfer between the data local memory (DLS) 14-1 and the global memory (GM) 17 is accumulated in the DLS command table 304.

A PE command table 305 provided to the processor element (PE) 12-1 is equivalent to the command pooling buffer 121 shown in FIG. 1. In the PE command table 305, a command corresponding to the processor element (PE) 12-1 is accumulated.

In the same way, a PLS managing table 401 and a DLS managing table 402 are also provided in the DMA controller 15-2 as a managing table which manages the local memory of the processor element (PE) 12-2. The PLS managing table 401 manages in which thread a corresponding program is stored for each storage area of the program local memory (PLS) 13-2. Additionally, the DLS managing table 402 manages in which thread a corresponding program is stored for each storage area of the data local memory (DLS) 14-2. Alternatively, a PLS command table 403 and a DLS command table 404 provided to the DMA controller 15-2 are equivalent to the command pooling buffer 151 shown in FIG. 1. The command with respect to the DMA transfer between the program local memory (PLS) 13-2 and the global memory (GM) 17 is accumulated in the PLS command table 403 and the command with respect to the DMA transfer between the data local memory (DLS) 14-2 and the global memory (GM) 17 is accumulated in the DLS command table 404. A PE command table 405 provided to the processor element (PE) 12-2 is equivalent to the command pooling buffer 121 shown in FIG. 1. In the PE command table 405, a command corresponding to the processor element (PE) 12-2 is accumulated.

Figure 7:
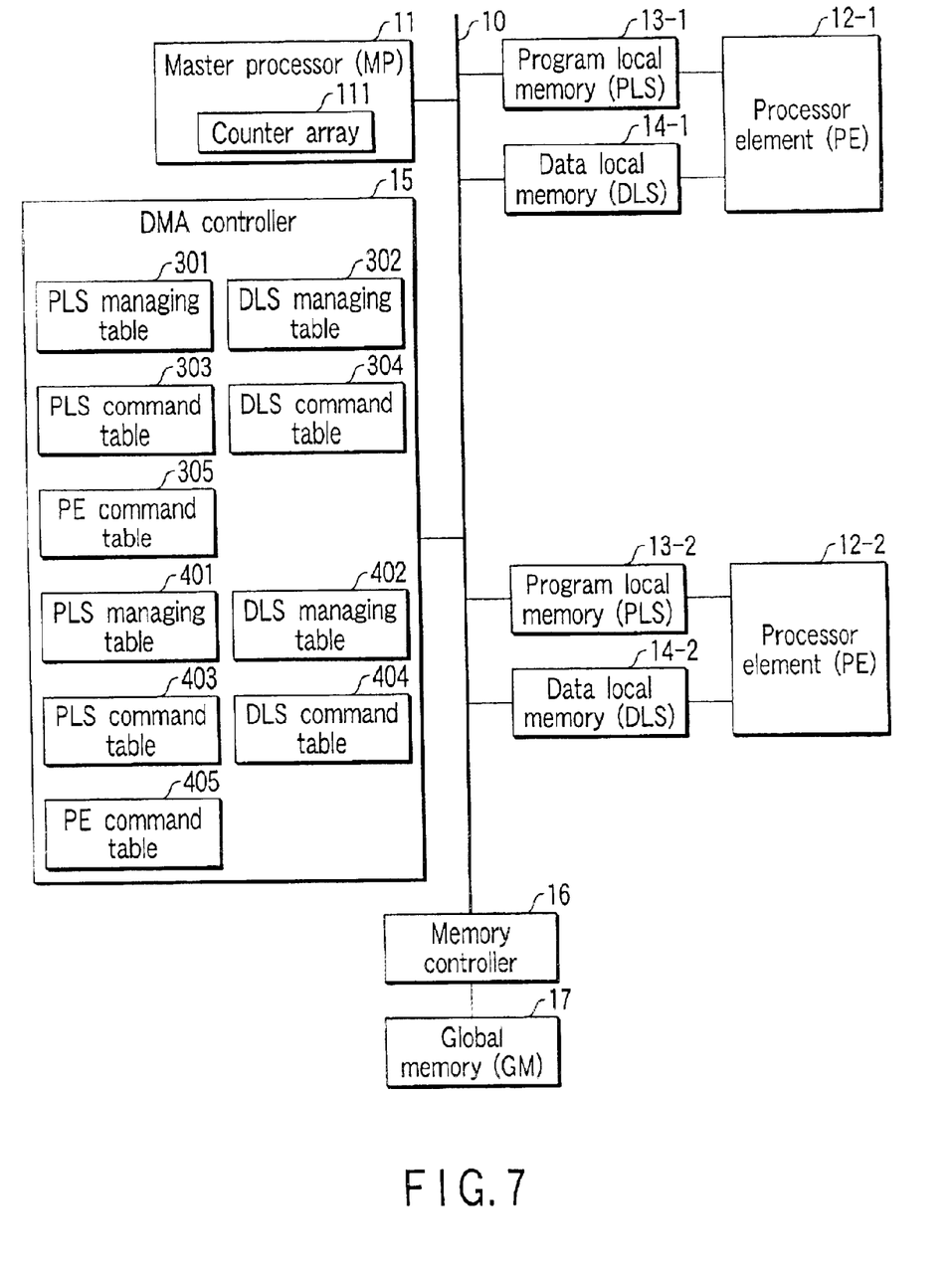
FIG. 7 is a block diagram for illustrating another configuration of the multiprocessor system according to the second embodiment.

Note here that it is not necessary to provide two DMA controllers for two processor elements (PE). Therefore, as shown in FIG. 7, only one DMA controller 15 may be connected to the bus 10 the DMA transfer may be performed between each local memory of the processor elements (PE) 12-1 and 12-2 and the global memory (GM) 17 by this DMA controller 15. This is also applicable to the first embodiment.

When one DMA controller 15 is used, all of the PLS managing table 301, the DLS managing table 302, the PLS command table 303 and the DLS command table 304 corresponding to the side of the local memory of the processor element (PE) 12-1 and the PLS managing table 401, the DLS managing table 402, the PLS command table 403 and the DLS command table 404 corresponding to the side of the local memory of the processor element (PE) 12-2 are provided in the DMA controller 15. Alternatively, the PE command tables 305 and 405 are not always mounted on the processor elements (PE) 12-1 and 12-2 but they may be provided in the DMA controller 15. This is also applicable to the first embodiment.

Next, the specific configurations of respective tables will be explained below.

In the second embodiment, it is assumed that a plurality of threads operate in parallel while using the same processor element (PE) and its local memories PLS and DLS. Accordingly, the PLS managing table 301 and the DLS managing table 302 manage the usage areas of the program local memory (PLS) 13-1 and the data local memory (DLS) 14-1 of the processor element (PE) 12-1 for each thread, respectively. The PLS managing table 401 and the DLS managing table 402 manage the usage areas of the program local memory (PLS) 13-2 and the data local memory (DLS) 14-2 of the processor element (PE) 12-2 for each thread, respectively.

The configurations of these tables are the same as the configurations of both of the processor elements (PE) 12-1 and 12-2, so that the processor elements (PE) 12-1 and 12-2 will be explained in common below.

Figure 8:
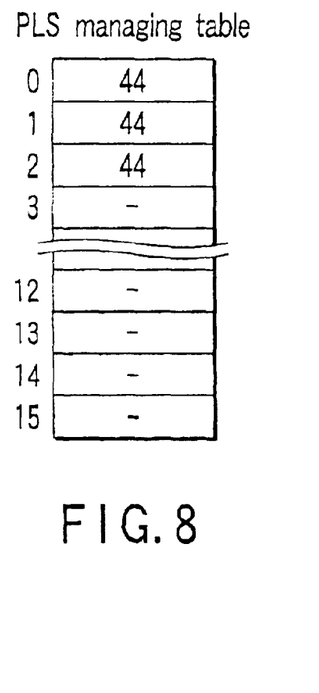
FIG. 8 is a drawing for illustrating a configuration of a PLS managing table according to the second embodiment.

The PLS managing table and the DLS managing table are managed in units of a page in order to simplify the hardware. For example, if a page size is 4 Kbyte and the sizes of the PLS and the DLS are 64 Kbyte, respectively, the PLS managing table and the DLS managing table are managed as sixteen pages, respectively. In this case, the PLS managing table has sixteen entries corresponding to the page and each entry indicates the VTID of a program placed in this page. FIG. 8 illustrates an example of the PLS managing table.

In FIG. 8, it is shown that the program of the VTID 44 is placed in the pages 0, 1 and 2 and other pages are not used.

Figure 9A:
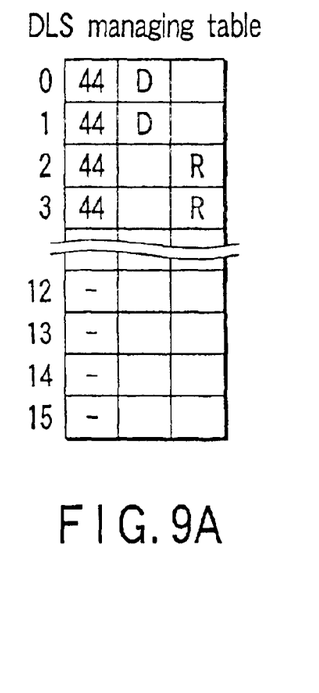
FIG. 9A is a drawing for illustrating a first configuration of a DLS managing table according to the second embodiment.
Figure 9B:
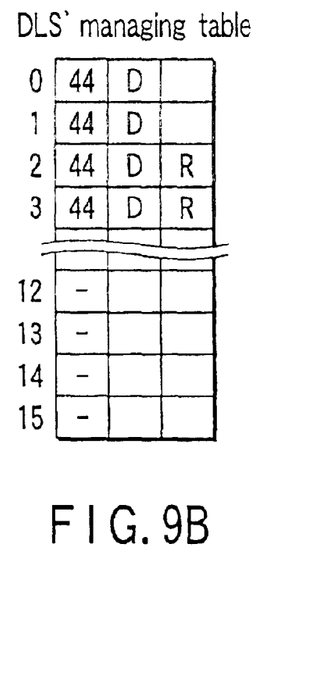
FIG. 9B is a drawing for illustrating a second configuration of the DLS managing table according to the second embodiment.

A DLS managing table for managing the DLS in which the data to be processed in each processor element (PE) or the data as a result of the processing in each processor element (PE) is placed will be explained below. FIGS. 9A and 9B illustrate an example of the DLS managing table.

In FIG. 9A, the data of the VTID 44 are placed in the pages 0 and 1 ("D" indicates that the data to be processed is placed). Further, in the pages 2 and 3, it is indicated that an area is reserved for the VTID 44 ("R" indicates that it is a reserved area). A reservation of an area indicates that a corresponding processor element (PE) uses this area for writing the processing result data. If the processor element (PE) writes the data in the reserved page, a bit is further placed in the D portion as shown in FIG. 9B.

Figure 10:
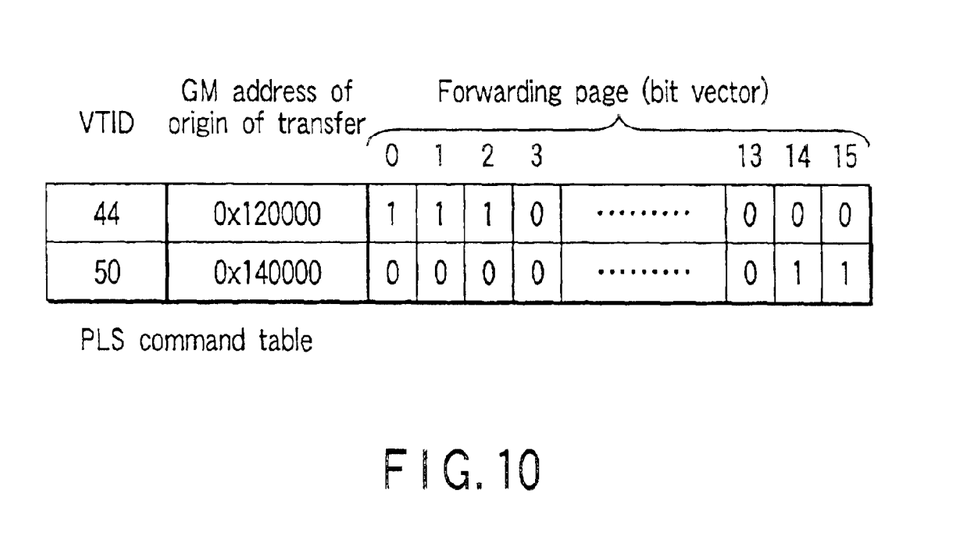
FIG. 10 is a drawing for illustrating a configuration of a PLS command table according to the second embodiment.

A PLS command table will be shown in FIG. 10. The PLS command table is a table in which a command of the DMA to transfer the data from the global memory (GM) 17 to the program local memory (PLS) is placed. The master processor (MP) 11 registers a command of the DMA in this table so as to transfer a program to be executed by the processor element (PE) from the global memory (GM) 17 to the program local memory (PLS) of the processor element (PE) to be controlled.

In FIG. 10, there are two entries in the PLS command table. One of them is the VTID 44, namely, a command to transfer a program from an address 0×120000 of the global memory (GM) 17 to the pages 0, 1 and 2 of the program local memory (PLS) and the other is a VTID 50, namely, a command to transfer a program from an address 0×140000 of the global memory (GM) 17 to the pages 14 and 15 of the program local memory (PLS). A content of the PLS command table is compared to the PLS managing table. When the page to which the program is transferred is vacant, the DMA of the command placed in this entry is performed. Then, when the DMA is performed, this entry is erased. When a plurality of entries can perform the DMA, they are performed in a first-in and first-out system. The number of the entries is limited due to the hardware, so that, if the entries are full, the processing is performed such as putting a thread from which the command of the master processor (MP) 11 is issued sleep or waiting until the entries or the like will be vacant.

Figure 11:
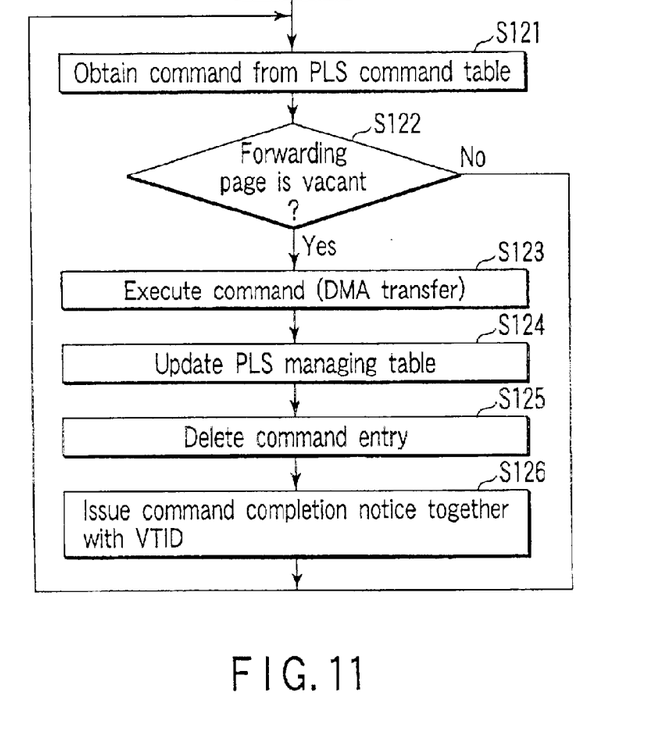
FIG. 11 is a flow chart for illustrating a processing procedure of a DMA controller with respect to a PLS command according to the second embodiment.

The processing procedure of the DMA controller with respect to the PLS command will be shown in FIG. 11. At first, the DMA controller obtains a command from the PLS command table (step S121) and it decides whether or not a forwarding page specified by this command is vacant on the program local memory (PLS) with reference to the PLS managing table (step S122). When the forwarding page is not vacant, the processing with respect to a next command entry is performed. On the other hand, when it is vacant, the DMA controller performs the processing of this obtained command, namely, it performs the DMA transfer of the program from the global memory (GM) 17 to the program local memory (PLS) (step S123). Consequently, the DMA controller sets a flag of D in the corresponding entry of the PLS managing table and updates a content of the flag of D (step S124). Then, after deleting a content of the corresponding command entry from the PLS command table (step S125), the DMA controller issues a command completion notice to the master processor (MP) 11 together with the VTID corresponding to the performed command (step S126).

In this way, the DMA controller executes a plurality of commands accumulated in the PLS command table sequentially from a command capable of being executed.

Figure 12:
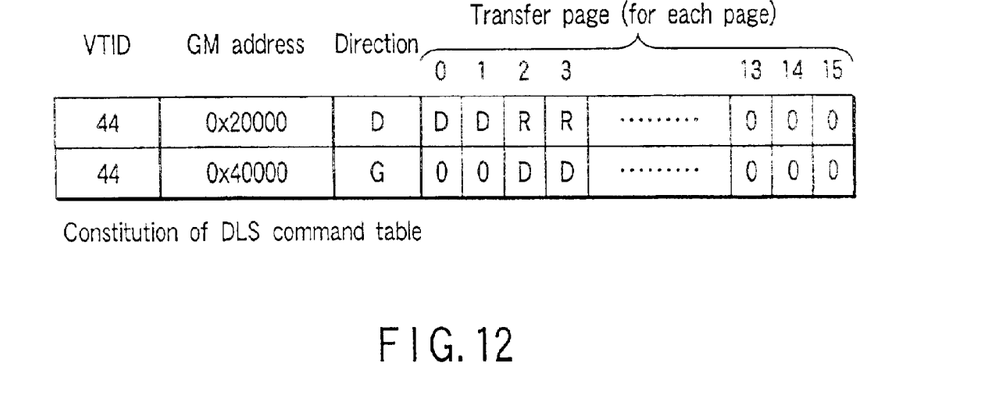
FIG. 12 is a drawing for illustrating a configuration of a DLS command table according to the second embodiment.

Next, a configuration of the DLS command table will be shown in FIG. 12. The DLS command table is a table for receiving a command of the DMA to transfer the data from the global memory (GM) 17 to the data local memory (DLS) and a command to transfer the data from the data local memory (DLS) to the global memory (GM) 17 from the master processor (MP) 11.

In FIG. 12, there are two entries in the DLS command table. One of them indicates that the data is transferred from an address 0×20000 of the global memory (GM) 17 to the data local memory (DLS) in the VTID 44. A directional field indicates a direction of the DMA transfer. In the directional field, "D" indicates the transfer from the global memory (GM) 17 to the data local memory (DLS) and "G" indicates the transfer from the data local memory (DLS) to the global memory (GM) 17. Alternatively, "D" in the field of the transfer page indicates an area to which the data is transferred and "R" indicates a reservation area to be used for writing the processing result data by the processor element (PE). According to this example, the data is transferred to the pages 0 and 1 by the GM. The pages 2 and 3 are reserved for writing.

In the second entry, a command is placed to transfer the processing result data written by the PE to the global memory (GM) 17. This command is treated by the same VTID 44, so that the VTID thereof is 44. An address of the global memory (GM) 17 is 0×40000. In this case, a direction of the transfer becomes "G" and "G" indicates the transfer from the data local memory (DLS) to the global memory (GM) 17. It is indicated that the pages 2 and 3 are transferred in the field of the transfer page.

As same as the PLS command table, the number of the entries is limited due to the hardware, so that, if the entries are full, the processing is performed such as putting a thread from which the command of the master processor (MP) 11 is issued sleep or waiting until the entries or the like will be vacant. The DMA command is executed from the DLS command table under the following conditions.

(1) when the directional field is "D": When the "D" and "R" indicated by the transfer page are vacant in the DLS managing table and the same VTID exist in the PLS managing table, namely, after performing the DMA, it is assured that a program to be processed by the processor element (PE) has been already placed in the program local memory (PLS) and an area of the data local memory (DLS) to take in and out the data does not clash with another thread.

(2) when the directional field is "G": A bit is placed in "D" indicated in the transfer page and "D" of the DLS managing table and the VTID thereof are identical. In other words, it is assured that the processing of the processor element (PE) indicated by the VTID is terminated, the data has been already written in the data local memory (DLS) and the data to be transmitted to the global memory (GM) 17 are prepared.

The DLS command table is processed in the first-in first-out system with respect to the same VTID, however, an order of the different VTID is not necessary to be assured.

Figure 13:
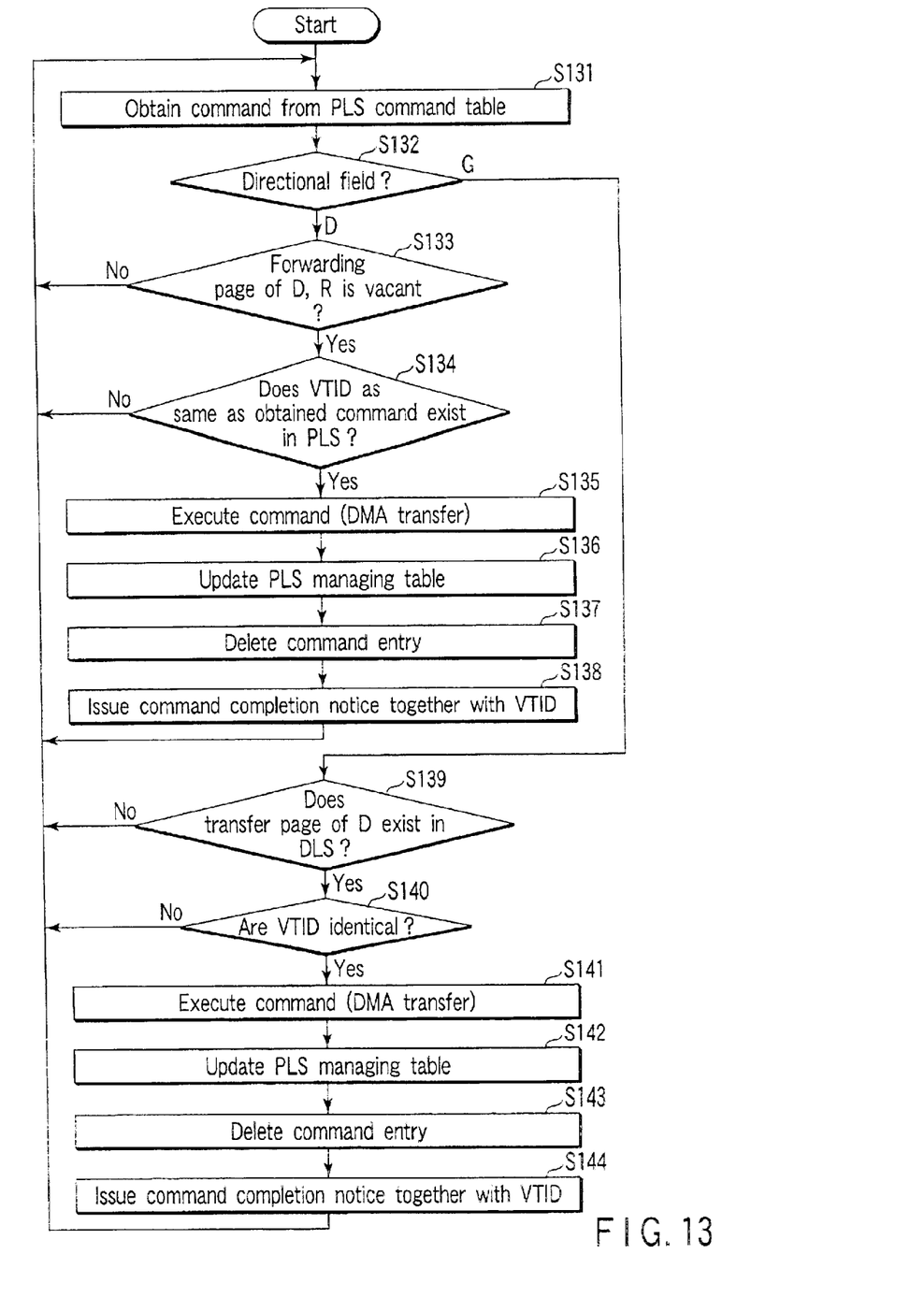
FIG. 13 is a flow chart for illustrating a processing procedure of the DMA controller with respect to a DLS command according to the second embodiment.

The processing procedure of the DMA controller with respect to the DLS command will be shown in FIG. 13. At first, the DMA controller obtains a command from the DLS command table (step S131) and a direction specified by this command is checked (step S132). If the directional field is "D", namely, it is a command to indicate the transfer to the data local memory (DLS), the DMA controller decides whether or not the forwarding pages of D and R specified by the obtained command are vacant on the data local memory (DLS) with reference to the DLS managing table (step S133). When they are vacant, further, the DMA controller decides whether or not a program having the same VTID as the VTID of the obtained command exists in the program local memory (PLS) with reference to the PLS managing table (step S134). When a program having the same VTID exists in the program local memory (PLS), the above described condition (1) is satisfied, so that the processing of the obtained command, namely, the DMA transfer from the global memory (GM) 17 to the data local memory (DLS) is performed (step S135). Consequently, the DMA controller sets the flags of D and R in the corresponding entries of the DLS managing table and updates the contents thereof (step S136). Then, after deleting the contents of the corresponding command entries from the DLS command table (step S137), the DMA controller issues the command completion notice as well as the VTID corresponding to the performed command to the master processor (MP) 11 (step S138).

When the above described condition (1) is not satisfied, namely, when the forwarding pages of D and R specified by the obtained command are not vacant and when the program of the same VTID does not exist even if they are vacant, the command processing is not performed and the processing for the next command entry is performed.

On the other hand, if the directional field specified by the obtained command is "G", namely, it is a command to indicate the transfer to the global memory (GM) 17, the DMA controller decides whether or not the data has already existed above the data local memory (DLS) specified by the transfer page of D of the obtained command with reference to the DLS managing table (step S139). When the data exists, it is decided whether or not the VTID corresponding to this data is identical with the VTID of the obtained command (step S140). When the VTID are identical, the above described condition (2) is satisfied, so that the DMA controller performs the processing of the obtained command, namely, it performs the DMA transfer of the data from the data local memory (DLS) to the global memory (GM) 17 (step S141). Consequently, the DMA controller resets the D flag of the corresponding entry of the DLS managing table and updates its content (step S142). Then, after deleting a content of the corresponding command entry from the DLS command table (step S143), the DMA controller issues the command completion notice as well as the VTID corresponding to the executed command to the master processor (MO) 11 (step S144).

When the above described condition (2) is not satisfied, namely, when the transfer page of D specified by the obtained command does not exist and when the VTID are different even if the transfer page of D exists, the command processing is not performed and the processing for a next command entry is performed.

In this way, the DMA controller will execute a plurality of commands accumulated in the DLS command table sequentially from a command capable of being executed.

The above described configuration is located within the DMA controller and it is managed and updated by a state machine.

Figure 14:
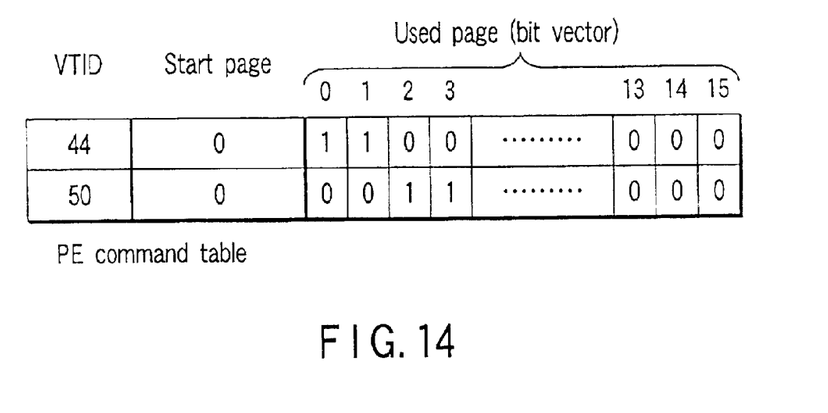
FIG. 14 is a drawing for illustrating a configuration of a PE command table according to the second embodiment.

Next, a configuration of the PE command table will be shown in FIG. 14. The PE command table is a table to give a command from the master processor (MP) 11 in the processor element (PE).

In FIG. 14, a first entry is a VTID 44 and a start page is 0. FIG. 14 shows a page on the program local memory (PLS), from which the processor element (PE) has to initiate the execution of a program. A used page field indicates a page in which the data to be used is located on the data local memory (DLS) for each page on the program local memory (PLS). According to an example shown in FIG. 14, it is indicated that the data in the pages 0 and 1 should be used. The command within the PE command table is used in fact when a used page in the PE command table is identical with a page indicated by "D" of the DLS managing table as well as the VTID of the both pages are identical with each other. In other words, this means that the data to be executed by the processor element (PE) are prepared in the data local memory (DLS). The fact that the data to be used in the processor element (PE) are prepared in the data local memory (DLS) implies that the corresponding program has been already prepared in the program local memory (PLS), so that it is possible to start the execution of the program immediately. If the execution of the program is terminated in the processor element (PE), the corresponding command is erase from the PE command table to update the DLS managing table (D is also raised in R). Alternatively, if this VTID does not require the program placed in the program local memory (PLS), the corresponding PLS managing table is also updated. It is clearly indicated whether or not the VTID requires the program in the program.

The PE command table is processed in the first-in first-out system with respect to the same VTID, however, an order of the different VTID is not necessary to be assured. The DLS command table is processed in the first-in first-out system with respect to the same VTID, however, an order of the different VTID is not necessary to be assured.

Figure 15:
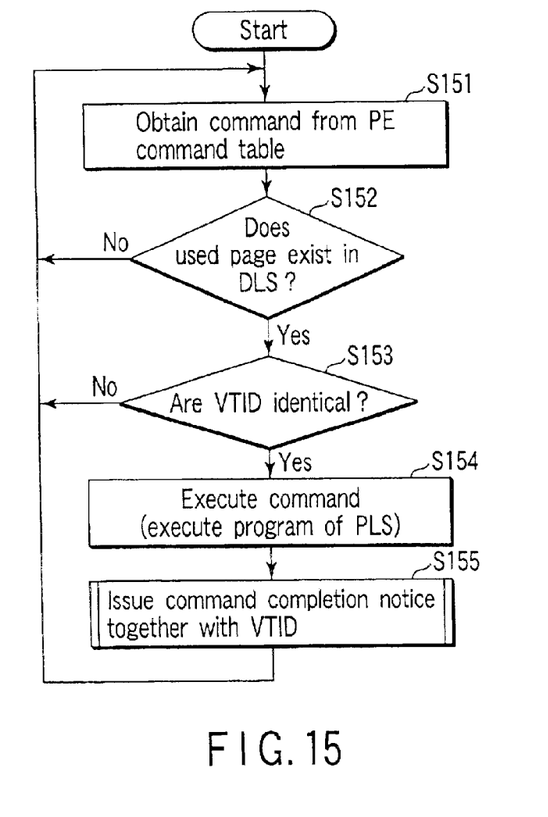
FIG. 15 is a flow chart for illustrating a processing procedure of a processor element with respect to a PE command according to the second embodiment.

The processing procedure of the processor element (PE) with respect to the PE command will be shown in FIG. 15. At first, the processor element (PE) obtains a command from the PE command table (step S151) and the processor element (PE) decides whether or not a used page to be specified by this command exists in the data local memory (DLS) with reference to the DLS managing table (step S152). If the used page to be specified by this command exists in the data local memory (DLS), it is decided whether or not the used page is identical with the VTID of the command obtained by the VTID of that data (step S153). If the used page is identical with the VTID of the obtained command, the processor element (PE) will perform the processing specified by the obtained command, namely, the execution processing of a program of the program local memory (PLS) (step S154). The data processed by the execution of this program is stored in a position on the corresponding data local memory (DLS), so that the DLS managing table is updated (D is also raised in R). Then, the command completion notice is issued to the master processor (MP) 11 together with the VTID corresponding to the executed command (step S155).

In this way, the processor element (PE) will execute a plurality of commands accumulated in the PE command table sequentially from a command capable of being executed.

Figure 16:
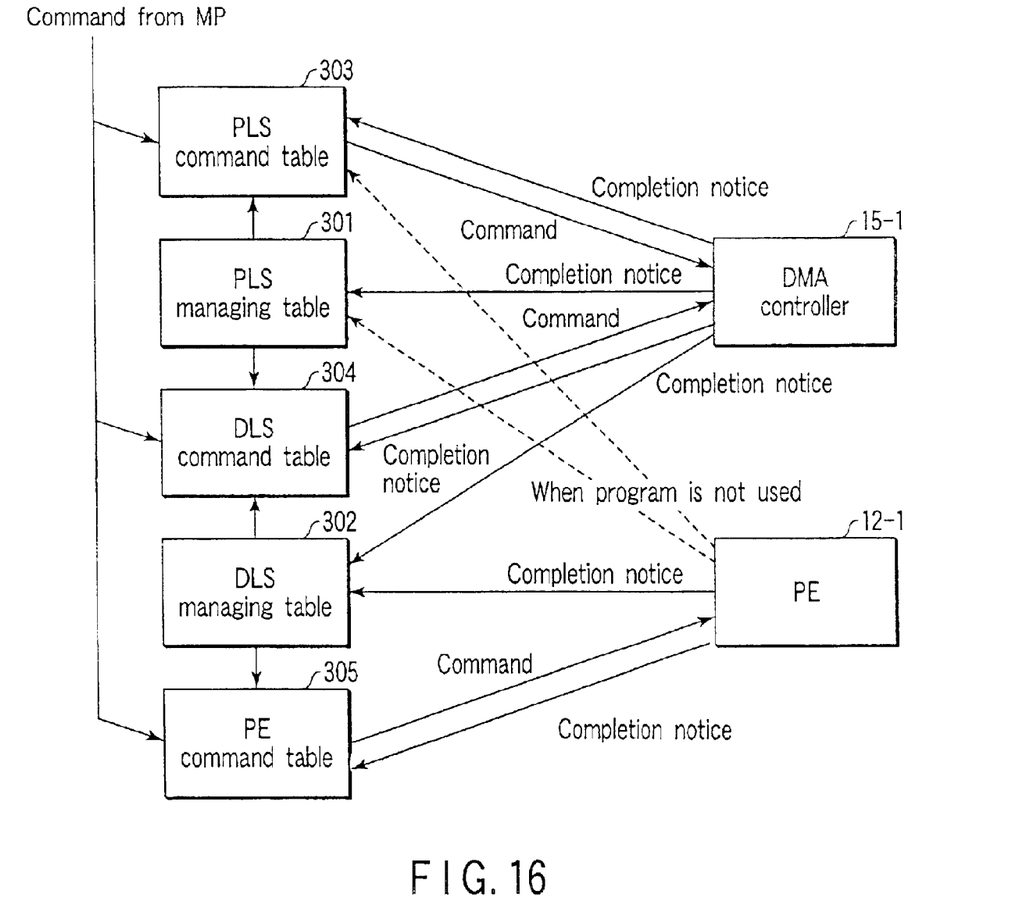
FIG. 16 is a diagram for illustrating a relation between the DMA controller, the processor element and respective tables according to the second embodiment.

FIG. 16 illustrates a relation between the DMA controller, the processor element (PE) and respective tables. In this case, the explanation will be given as focusing on the side of the processor element (PE) 12-1, however, the same explanation is given to the side of the processor element (PE) 12-2.

As shown in FIG. 16, a command is registered in the PLS command table 303, the DLS command table 304 and the PE command table 305 from the master processor (MP). Then, the PLS command table 301 and the DLS command table 302 are updated in response to the execution of the command by the DMA controller 15-1 and the processor element (PE) 12-1. The PLS command table 301 and the DLS command table 302 appropriately manages the local memory, so that the data, which has been executing, is controlled so that it is not rewritten by another thread.

With respect to the processor element (PE) 12-1, the corresponding program operates only when the data to be processed exists. In other words, according to the present invention, a dependency relation between the DMA and the processing of the processor element (PE) is appropriately described and it is possible to operate the DMA and the processor element (PE) in an accurate order without the interruption by the master processor (MP), so that it is possible to decrease a load to the master processor (MP). Further, sharing a resource by a plurality of threads enables the effective operation such as using the processor element (PE) in the program processing by another thread during preparing the processing data in the local memory, for example, by the DMA transfer. This method becomes particularly effective by making the local memory in a double buffer configuration, making one thread to perform the processing of one buffer and making the other thread to perform the processing of the other buffer.

Figure 17:
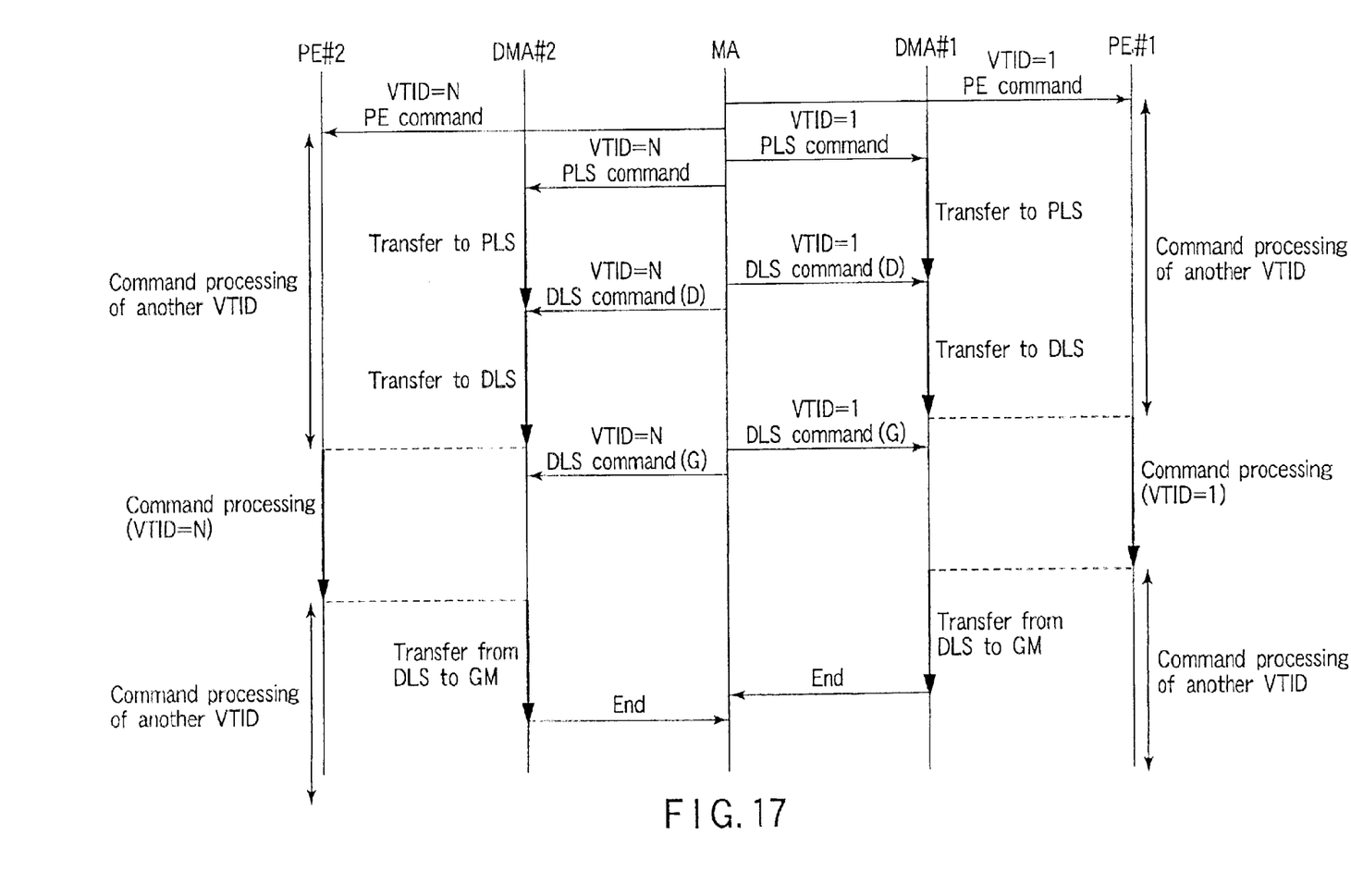
FIG. 17 is a diagram for schematically illustrating the entire multiprocessor system according to the second embodiment.

FIG. 17 schematically illustrates the operation of the entire multiprocessor system of the present invention.

At first, a certain thread to be executed on the master processor (MP) registers a command (PE command) in the PE table corresponding to a processor element PE #1 together with the VTID (here, VTID=1) of this thread. Consequently, this thread registers some commands (PLS commands) necessary for transferring all of the programs to be processed by the processor element PE #1 to the data local memory (DLS), in the PLS command table together with the VTID (here VTID=1). After that, this thread registers some commands (DLS command direction D) necessary for transferring all of the data to be processed by the processor element PE #1 to the data local memory (DLS), in the DLS command table together with the VTID (here VTID=1). Additionally, this thread registers some commands (DLS command direction G) necessary for transferring all of the processing result data to the global memory (GM), in the DLS command table together with the VTID (here VTID=1). As a result, the thread waits for the command processing, shifts to a sleeping state and another thread is executed on the master processor (MP). As a matter of course, when a series of command registration cannot be performed in mid course, the thread may be switched at the point.

If a DMA controller #1 performs the DMA transfer of the program to the program local memory (PLS) and performs the DMA transfer of the data to be processed to the data local memory (DLS), it becomes possible to process the PE command by the processor element PE #1. Then, the program on the PLS is executed by the processor element PE #1 and the processing result data is written in the DLS. Hereby, it becomes possible to process the command (DLS command direction G) by the DMA controller #1, so that the processing result data is DMA-transferred to the global memory. At this point of time, there is no command which has received no response with respect to VTID=1 and a thread of VTID=1 is raised again.

As described above, according to the present processor system, by managing a thread in which the corresponding program or the corresponding data is stored for each storage area of the local memory, it is possible to solve a problem with respect to unconformity of the treated data. Further, the DMA controller and each processor element (PE) can specify an executable command among the commands from respective threads accumulated in the corresponding command accumulating buffers, respectively, so that it becomes possible to accurately execute the commands from the executable command by rotation and it becomes possible to decrease a vacant time of the DMA controller and each processor element (PE).

The present system is described from the aspects of the first embodiment and the second embodiment. However, the functions of respective embodiments can be combined appropriately to be used. A program to be performed by the master processor (MP) is a multithread type preferably, however, each of a plurality of program executable units capable of being executed in parallel may be configured so as to perform the necessary calculating processing or the like by using a processor element. Further, a function such as the switching of the thread or the like may be incorporated in a kernel of an operating system to be performed on the master processor (MP) or a function for switching the thread may be realized by using a dedicated program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multiprocessor system comprising:
   a master processor that issues commands;
   a plurality of processor-elements, each of which has a local memory and a first command pooling buffer, the first command pooling buffer pooling the commands issued from the master processor, wherein the processor-elements are controlled by the commands in the buffer;

a global memory which is common to the master processor and the processor-elements;

a transfer device having a second command pooling buffer, the transfer device being controlled by some of the commands issued from the master processor, to transfer a program/data between the local memory of the processor-elements and the global memory, wherein the commands are pooled in the second command pooling buffer; and a counter device to notify the master processor that the number of responses to the commands issued from the master processor, returned from the processor-elements and transfer device, has reached a predetermined number of responses, the predetermined number being pre-stored in the counter device.

2. The system according to claim 1, wherein the transfer device includes a direct memory access (DMA) controller.

3. The system according to claim 1, wherein the master processor issues the commands for controlling both transfer device and processor-elements by a multithreaded program.

4. The system according to claim 3, wherein the commands include a first command together with a first thread identifier and a second command together with a second thread identifier, the first and second thread identifiers being generated according to the multithreaded program.

5. The system according to claim 1, wherein the second command pooling buffer of the transfer device includes:

a program local storage (PLS) command table; and a data local storage (DLS) command table.

6. The system according to claim 5, wherein the transfer device includes:

a statemachine configured to manage an execution of a program local storage command, wherein the command specifies a transfer of a program from the master processor to one of the processor-elements and the command is acquired from the program local storage command table, and configured to manage an execution of a data local storage command, wherein the command specifies a transfer of data from the master processor to one of the processor-elements and the data is acquired from the data local storage command table.

7. The system according to claim 6, further comprising:

a program local storage managing table, to be referred by the statemachine, for managing the local memory of the corresponding one of the processor-elements; and a data local storage managing table, to be referred by the statemachine, for managing the local memory of the corresponding one of the processor-elements.

8. The system according to claim 7, wherein each of the processor-elements executes the program transferred to the local memory after confirming that the data to be used by the program is prepared in the local memory by referring to the data local storage managing table.

9. The system according to claim 1, wherein the master processor issues the commands continuously.

10. The system according to claim 1, wherein the counter device counts the responses from the processor-elements and transfer device.

11. The system according to claim 1, wherein the predetermined number is at least more than 2.

12. A control method for controlling the operation of a multiprocessor system including: a master processor; at least one processor-element having a program local memory and a data local memory; a global memory which is common to the master processor and processor-element; and a transfer device, the method comprising:

continuously issuing a plurality of commands by the master processor;

transferring a program from the global memory to the program local memory by the transfer device in accordance with one of the commands;

transferring a data from the global memory to the data local memory by the transfer device in accordance with another one of the commands;

executing the program by the processor-element, the processor-element referring to the program local memory and data local memory in accordance with still another one of the commands;

transferring the execution result of the program from the data local memory to the global memory by the transfer device in accordance with still another one of the commands; and notifying the master processor that the number of responses to the commands issued from the master processor, returned from the processor-element and transfer device, has reached a predetermined number of responses, the predetermined number being pre-stored.

13. The method according to claim 12, wherein the transfer device includes a direct memory access (DMA) controller.

14. The method according to claim 12, wherein the master processor issues the commands for controlling the transfer device and processor-element by a multithreaded program.

15. The method according to claim 14, wherein the commands include a first command together with a first thread identifier and a second command together with a second thread identifier, the first and second thread identifiers being generated according to the multithreaded program.

16. The method according to claim 12, wherein the processor-element executes the program transferred to the program local memory after confirming that the data to be used by the program is prepared in the data local memory by referring to a data local storage managing table.

17. The method according to claim 12, wherein the master processor issues the commands continuously.

18. The method according to claim 12, wherein the predetermined number is at least more than 2.

* * * * *